Patented Dec. 26, 1939

2,184,515

UNITED STATES PATENT OFFICE 2,184,515

MANUFACTURE OF NEW AZO DYESTUFFS

Wilfrid Herbert Cliffe, Blackley, Manchester, England, assignor to Imperial Chemical Industries Limited, a corporation of Great Britain No Drawing. Application September 12, 1938, Serial No. 229,638. In Great Britain September 16, 1937

7 Claims. (Cl. 260—160)

This invention relates to the manufacture of azo dyes.

This invention has as an object to devise a new method of manufacturing azo dyes. A still further object is to provide new azo dyes. A still further object is to devise a method of manufacturing intermediates valuable in the manufacture of azo dyes. A still further object is to provide such intermediates. Further objects will appear hereinafter. These objects are accomplished by the following invention.

I have found that I can prepare new azo dyestuffs by tetrazotising a diaminobenzenesulphon-N-alkylanilide of the general formula

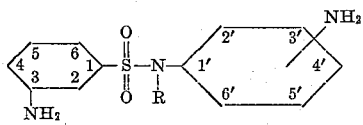

in which R stands for alkyl (having less than five carbon atoms), aralkyl, and in which one or both the benzene residues may carry one or more substituents, including methyl groups, and coupling with two molecular proportions of the same or different coupling components which may be naphthol-sulphonic acids, amino-naphthol sulphonic acids, including their N-substituted derivatives or arylpyrazolone sulphonic acids.

Alternatively according to the invention the dyestuffs are made by coupling a diazotised nitroaminobenzene-sulphon-N-alkylanilide corresponding to the diaminobenzene-sulphon-N-alkylanilide defined above but having a nitro substituent in place of one of the two amino substituents, with one molecular proportion of a coupling component as before, reducing the nitro substituent to an amino substituent, diazotising and then coupling with one molecular proportion of the same or a different coupling component as before.

The diamino- or nitroaminobenzenesulphon-N-alkylanilides may be obtained by condensing a mononitro-N-alkylarylamine of the benzene series with a m-nitrobenzene-sulphonyl chloride, and then reducing one or both of the nitro substituents. Alternatively, a mononitroarylamine of the benzene series may be condensed with a m-nitrobenzene-sulphonyl chloride, the product alkylated or aralkylated in a suitable manner, e. g. by means of a dialkyl sulphate or an aralkyl chloride, and one or both of the nitro substituents reduced as before.

The invention is illustrated, but not limited, by the following examples, in which the parts are by weight.

Example 1

43.7 parts of 3:3'-diaminobenzenesulphon-N-methylanilide dihydrochloride, prepared as described below, are dissolved in 37.5 parts of 36% aqueous hydrochloric acid and 500 parts of water and tetrazotised at 0–5° C. with a solution of 17.2 parts of sodium nitrite in 125 parts of water. The resulting tetrazo solution is then gradually added to an ice-cold solution of 87 parts of the disodium salt of 2-naphthol-6:8-disulphonic acid and 30 parts of anhydrous sodium carbonate in 800 parts of water. When coupling is complete the dyestuff is precipitated by the addition of sodium chloride, filtered off and dried. The new dyestuff is soluble in water and dyes wool from an acid or neutral bath in orange shades of very good fastness to washing and milling. It has the probable formula

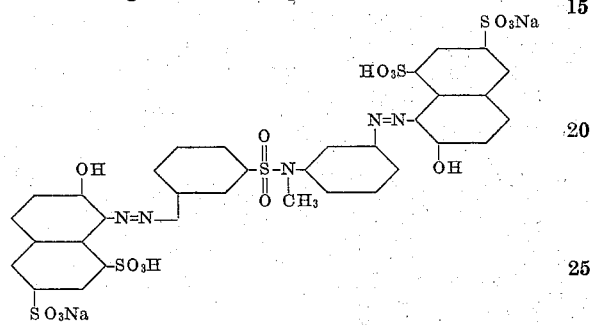

The 3:3'-diaminobenzenesulphon-N-methylanilide dihydrochloride used in the above example is a new compound and is made as follows. A solution of 138 parts of m-nitroaniline and 111 parts of m-nitrobenzenesulphonyl chloride in 500 parts of toluene is refluxed for 4 hours, and the resulting 3:3'-dinitrobenzenesulphonanilide is then converted into the dry sodium salt. 69 parts of the sodium salt are boiled under reflux with 200 parts of toluene and 28 parts of dimethyl sulphate added during 30 minutes. Refluxing is continued for a further 5 hours. The 3:3'-dinitrobenzenesulphon - N - methylanilide (M. P. 145° C.) thus formed is then reduced to the required diamine by iron and hydrochloric acid in water or ethyl alcohol and isolated as the dihydrochloride.

Example 2

36.4 parts of 3:3'-diaminobenzenesulphon-N-ethylanilide, made as described below, are dissolved in a mixture of 62.5 parts of 36% aqueous hydrochloric acid and 500 parts of water, and tetrazotised at 0–5° C. with a solution of 17.2 parts of sodium nitrite in 125 parts of water. The resulting tetrazo solution is gradually added to an ice-cold solution which contains 63.6 parts of 1-(4'-sulphophenyl)-3-methyl-5-pyrazolone and 50 parts of anhydrous sodium carbonate in 800 parts of water. Coupling is rapid and the new dyestuff is filtered off and dried. The new dyestuff dissolves in water and dyes wool from a neutral or acid bath in bright yellow shades.

The dyeings have very good fastness to washing, milling and light. The dyestuff has the probable formula

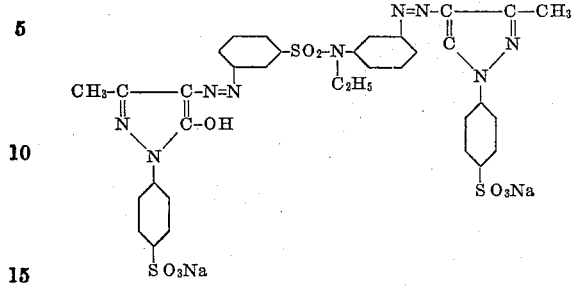

The 3:3'-diaminobenzenesulphon-N-ethylanilide used above is a new compound and is made as follows. 152 parts of 3-nitro-N-ethylaniline and 111 parts of 3-nitrobenzenesulphonyl chloride together with 800 parts of toluene are heated on the steam-bath for several hours. The toluene is then removed by steam distillation and the unchanged 3-nitro-N-ethylaniline by boiling with dilute hydrochloric acid. On extracting the residue with boiling dilute sodium carbonate solution 3:3'-dinitrobenzenesulphon - N - ethylanilide is left. It may be purified by recrystallising it from ethyl alcohol. The pure compound melts at 128° C. and is reduced to the required diamine (M. P. 92° C.) by means of iron and hydrochloric acid in either water or ethyl alcohol.

Example 3

38.1 parts of 3:3'-diamino-6'-methylbenzenesulphon-N-ethylanilide, made as described below, are dissolved in 62.5 parts of 36% aqueous hydrochloric acid and 500 parts of water and tetrazotised at 0–5° C. with a solution of 17.2 parts of sodium nitrite in 125 parts of water. The resulting tetrazo solution is gradually added to an ice-cold solution containing 70 parts of the disodium salt of 2-naphthol-6:8-disulphonic acid and 40 parts of anhydrous sodium carbonate in 800 parts of water. The new dyestuff is rapidly formed and is precipitated by the addition of sodium chloride, filtered off and dried. The new dyestuff is soluble in water and dyes wool from an acid or neutral bath in bright yellowish-orange shades of very good fastness to washing, milling and light. It has the probable formula

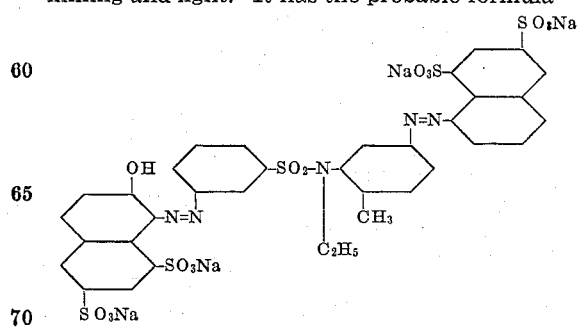

The 3:3'-diamino-6'-methylbenzenesulphon-N-ethylanilide which is used above is a new compound and is made by condensing 2-ethylamino-4-nitrotoluene with 3-nitrobenzenesulphonyl chloride in toluene solution at 90–100° C. The resulting 3:3'-dinitro-6'-methylbenzenesulphon-N-ethylanilide (M. P. 151° C.) is reduced to the required diamine (M. P. 116° C.) by means of iron and hydrochloric acid in either water or ethyl alcohol.

Example 4

36.4 parts of s:4'-diaminobenzenesulphon-N-ethylanilide, prepared as described below, are dissolved in 62.5 parts of 36% aqueous hydrochloric acid and 500 parts of water and tetrazotised at 0–5° C. with a solution of 17.2 parts of sodium nitrite in 125 parts of water. The resulting tetrazo solution is gradually added to an ice-cold solution of 76 parts of the sodium salt of 2-acetylamino-8-naphthol-6-sulphonic acid and 40 parts of anhydrous sodium carbonate in 800 parts of water. The new dyestuff is rapidly formed and is filtered off and dried. The new dyestuff is soluble in water and dyes wool from an acid or neutral bath in scarlet shades of good fastness to washing and milling. It has the probable formula

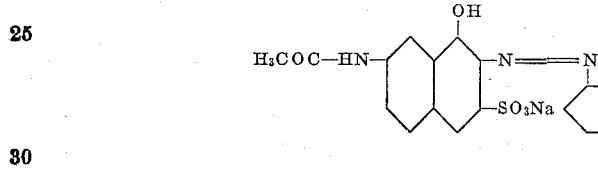

The 3:4'-diaminobenzenesulphon-N-ethylanilide which is used above is a new compound and is made as follows. 92 parts of p-nitroaniline and 74 parts of 3-nitrobenzenesulphonyl chloride together with 400 parts of toluene are refluxed for several hours. The toluene is distilled in steam and the residue extracted with boiling hydrochloric acid in order to remove the excess of p-nitroaniline. The 3:4'-dinitrobenzenesulphonanilide (M. P. 180° C.) which remains is then converted into the dry sodium salt. 52 parts of the sodium salt and 27.4 parts of diethylsulphate together with 300 parts of toluene are boiled under reflux for about 5 hours. The toluene is steam distilled and the residual solid collected, washed first with warm dilute sodium hydroxide solution and then with water, and dried. The 3:4'-dinitrobenzenesulphon-N-ethylanilide (M. P. 138° C.) thus obtained is reduced to the required diamine (M. P. 118° C.) with iron and hydrochloric acid in either water or ethyl alcohol.

Example 5

To a solution of 32.1 parts of 3-amino-4'-nitrobenzenesulphon-N-ethylanilide (made by reducing 3:4'-dinitrobenzenesulphon-N-ethylanilide, obtained according to Example 4) in 590 parts of glacial acetic acid are added 25 parts of 36% aqueous hydrochloric acid followed by 240 parts of water. The solution is cooled to 0–5° C. and a solution of 6.9 parts of sodium nitrite in 50 parts of water gradually added. The resulting diazo solution is then slowly added to an ice-cold solution of 34.8 parts of the disodium salt of 2-naphthol-6:8-disulphonic acid and 550 parts of anhydrous sodium carbonate in 1600 parts of water. When coupling is complete the monoazo compound is filtered off and stirred at 50° C. with 1500 parts of water and 36 parts of crystalline sodium sulphide until reduction of the nitro substituent is complete. The aminoazo compound so obtained is precipitated by the addition of hydrochloric acid and sodium chloride and filtered off. It is then dissolved in 1500 parts of water, sufficient sodium carbonate being added to make the solution neutral. After cooling the solution of the aminoazo compound to 5° C. 6.9 parts of sodium nitrite in 50 parts of water and then 25 parts of 36% aqueous hydrochloric acid are added thereto. After one hour's stirring the mixture is added to an ice-cold solution of 24.6 parts of the sodium salt of 1-naphthol-4-sulphonic acid and 20 parts of anhydrous sodium carbonate in 500 parts of water. When coupling is complete the disazo dyestuff is precipitated by the addition of sodium chloride, filtered off and dried. It has the probable formula

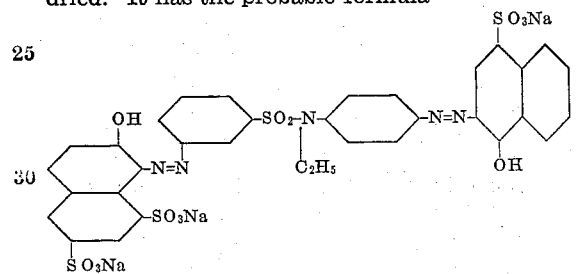

Example 6

31.9 parts of 3:4'-diaminobenzenesulphon-N-n-butylanilide, (made by condensing together 4-nitro-N-n-butylanilide and 3-nitrobenzenesulphonyl chloride and reducing the dinitro compound obtained), are dissolved in 50 parts of 36% aqueous hydrochloric acid and 500 parts of water and tetrazotised at 0–5° C. by the addition of 13.8 parts of sodium nitrite in 100 parts of water. The resulting tetrazo solution is gradually added to an ice-cold solution of 49.2 parts of the sodium salt of 1-naphthol-4-sulphonic acid and 20 parts of anhydrous sodium carbonate in 300 parts of water. The dyestuff is rapidly precipitated and is filtered off and dried. The new dyestuff is soluble in water and dyes wool from an acid or neutral bath in reddish-orange shades of very good fastness to washing and milling. It has the probable formula

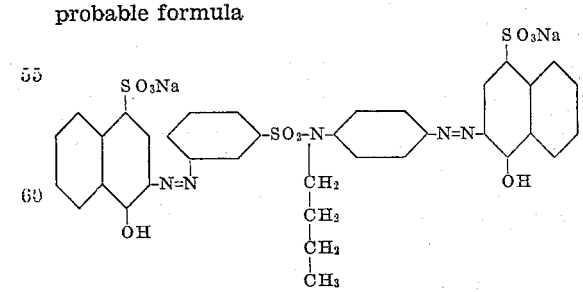

Example 7

35.3 parts of 3:4'-diaminobenzenesulphon-N-benzylanilide (made by reacting with benzyl chloride 3:4'-dinitrobenzenesulphonanilide, obtained according to Example 4, and reducing the resulting compound) are dissolved in 50 parts of 36% aqueous hydrochloric acid and 500 parts of water by warming. The resulting solution is then cooled to 0–5° C. and 13.8 parts of sodium nitrite in 100 parts of water are added thereto. The tetrazo compound so obtained is gradually added to an ice-cold solution of 36.1 parts of 1-acetylamino-8-naphthol-3:6-disulphonic acid in 600 parts of water containing sufficient sodium carbonate to keep the coupling mixture alkaline. When coupling is complete the new dyestuff is precipitated by the addition of sodium chloride, filtered off and dried. It dissolves in water and dyes wool from an acid or neutral bath in red shades of very good fastness to washing and milling. It has the probable formula

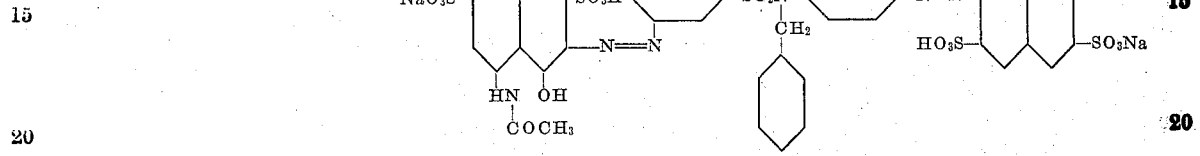

Example 8

To a solution of 38.3 parts of 3-amino-3'-nitrobenzenesulphon-N-benzylanilide (made by reacting with benzyl chloride, and afterwards reducing, 3:3'-dinitrobenzenesulphonanilide obtained according to Example 1) in 424 parts of glacial acetic acid and 25 parts of 36% aqueous hydrochloric acid, are added 200 parts of water. The solution is cooled to 0–5° C. and 6.9 parts of sodium nitrite in 50 parts of water added thereto. The resulting diazo solution is then run gradually into an ice-cold solution of 30.4 parts of 2-naphthol-6:8-disulphonic acid in 1600 parts of water containing sufficient sodium carbonate to keep the coupling mixture alkaline. When coupling is complete the monoazo dyestuff is filtered off and treated at 50° C. in 1600 parts of water with 36 parts of crystalline sodium sulphide in order to reduce the nitro substituent. The aminoazo compound so obtained is precipitated by the addition of sodium chloride, filtered off and redissolved in 2000 parts of hot water. To this solution cooled to 10° C. are added 6.9 parts of sodium nitrite in 50 parts of water and then 45 parts of 36% aqueous hydrochloric acid. When diazotisation is complete the diazo compound is run into an ice-cold solution of 22.4 parts of 2-naphthol-8-sulphonic acid in 300 parts of water containing sufficient sodium carbonate to keep the coupling mixture alkaline. After 2 hours the new dyestuff is precipitated by the addition of sodium chloride, filtered off and dried. It dissolves in water and dyes wool from an acid or neutral bath in orange shades of very good fastness to washing and milling. It has the probable formula

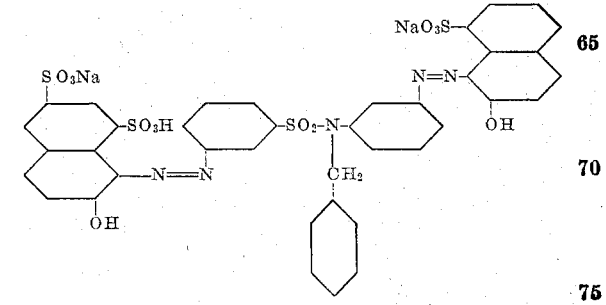

Further dyestuffs obtained according to the invention are given in the following table.

| Example | Tetrazo component | Coupling component | Shade on wool |
|---|---|---|---|
| 9 | 1 mol. 3:3'-diamino-benzenesulphon-N-methylanilide. | 2 mols. 1-naphthol-4-sulphonic acid | Reddish-orange. |
| 10 | 1 mol. 3:3'-diamino-benzenesulphon-N-ethylanilide. | 2 mols. 2-naphthol-6:8-disulphonic acid | Orange. |
| 11 | ----do---- | 2 mols. 2-acetylamino-8-naphthol-6-sulphonic acid | Scarlet. |
| 12 | ----do---- | 2 mols. 2-phenylamino-8-naphthol-6-sulphonic acid | Brown. |
| 13 | 1 mol. 3:3'-diamino-6'-methylbenzene-sulphon-N-ethylanilide. | 2 mols. 2-N-$\beta$-hydroxy-ethylamino-8-naphthol-6-sulphonic acid. | Red-brown. |
| 14 | ----do---- | 2 mols. 1-(2':5'-dichloro-4'-sulphophenyl)-3-methyl-5-pyrazolone. | Yellow. |
| 15 | ----do---- | 2 mols. 2-phenylamino-8-naphthol-6-sulphonic acid. | Red-brown. |
| 16 | ----do---- | 2 mols. 2:8-aminonaphthol-6-sulphonic acid (alkaline). | Do. |
| 17 | ----do---- | 2 mols. 1-naphthol-4-sulphonic acid | Reddish-orange. |
| 18 | 1 mol. 3:4'-diamino-benzenesulphon-N-ethylanilide. | 2 mols. 1-(2':5'-dichloro-4'-sulphophenyl)-3-methyl-5-pyrazolone. | Yellow. |
| 19 | ----do---- | 2 mols. 2-naphthol-6:8-disulphonic acid | Orange. |
| 20 | ----do---- | 2 mols. 1-naphthol-4-sulphonic acid | Scarlet. |
| 21 | ----do---- | 2 mols. 2-acetylamino-5-naphthol-7-sulphonic acid. | Reddish-orange. |
| 22 | ----do---- | 2 mols. 1-acetylamino-8-naphthol-3:6-disulphonic acid. | Bluish-red. |
| 23 | ----do---- | 2 mols. 2:8-aminonaphthol-6-sulphonic acid (acid) | Yellowish red. |
| 24 | ----do---- | 2 mols. 2-phenylamino-8-naphthol-6-sulphonic acid. | Brown. |
| 25 | ----do---- | 2 mols. 1-benzoylamino-8-naphthol-4:6-disulphonic acid. | Red. |
| 26 | 1 mol. 3:4'-diaminobenzenesulphon-N-n-butylanilide. | 2 mols. 1:8-amino-naphthol-4:6-disulphonic acid | Bluish-red. |
| 27 | 1 mol. 3:4'-diaminobenzenesulphon-N-benzylanilide. | 2 mols. 1-(2':5'-dichloro-4'-sulphophenyl)-3-methyl-5-pyrazolone. | Yellow. |
| 28 | ----do---- | 2 mols. 2-naphthol-6:8-disulphonic acid | Orange. |
| 29 | ----do---- | 2 mols. 1-naphthol-4-sulphonic acid | Scarlet. |
| 30 | ----do---- | 2 mols. 1-phenylamino-8-naphthol-6-sulphonic acid. | Brown. |

In the above examples the benzene rings of the diamino-benzenesulphon-N-alkylanilides either carry no substituent groups or carry methyl groups, but compounds in which the benzene rings carry such groups as alkoxy, halogen, and hydroxy, could also be used according to the invention. Such compounds are for example 3:3'-diamino-4-chlorobenzene-sulphon-N-methylanilide and 3:3'-diamino-6'-methoxy-benzenesulphon-N-ethylanilide.

Among N-substituted derivatives of the aminonaphthol sulphonic acids useful as coupling compounds according to this invention may be mentioned alkyl and substituted alkyl derivatives such as N-methyl and N-ethyl derivatives, e. g., 1-N-ethylamino-8-naphthol-4 sulphonic acid, and N-hydroxyalkyl derivatives such as the 2-N-$\beta$-hydroxyethylamino- 8 -naphthol- 6 -sulphonic acid of Example 13. Further there should be mentioned N-aryl derivatives such as N-phenyl, N-tolyl, N-xylyl, and N-chlorophenyl, N-sulphophenyl and N-sulphotolyl derivatives. As examples of these I mention 2-phenylamino-8-naphthol-6-sulphonic acid and 2-N-o-sulphotolyl-8-naphthol-6-sulphonic acid. N-aralkylaminonaphthol sulphonic acids such as 1-N-benzylamino-8-naphthol-3:6-disulphonic acid, and N-acyl aminonaphthol sulphonic acids, where acyl stands for acetyl, propionyl, oxalyl, carbonyl, (N'N'-), chlorobenzoyl, and benzenesulphonyl, come also to be considered. Further examples of these are: the urea obtained by phosgenating 2-amino-5-naphthol-7-sulphonic acid, and the urethane from 2-amino-6-naphthol-8-sulphonic acid.

This invention is a valuable advance in the art as it discloses a broad new range of dyestuffs and intermediates therefor. The dyestuffs dye wool from a neutral or acid bath and the resulting dyeings are characterised by very good fastness to washing, milling and light.

As many apparently widely different embodiments of this invention may be made without departing from the spirit and scope thereof, it is to be understood that the invention is not limited to the specific embodiments thereof except as defined in the appended claims.

I claim:
1. A compound represented by the formula

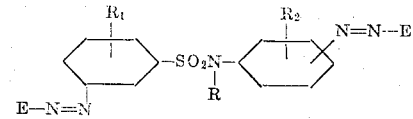

in which the group —N=N—E is in one of the positions meta and para to —NR—; R is one of a group consisting of alkyl having one to four carbons and aralkyl; $R_1$ and $R_2$ are from the group consisting of hydrogen, alkyl, alkoxy and halogen; and E is the residue after coupling in basic medium of an azo dye coupling component of a group consisting of naphthol sulfonic acids, amino-naphthol sulfonic acids, N-alkyl naphthol sulfonic acids, N-hydroxy-alkyl naphthol sulfonic acids, N-aralkyl naphthol sulfonic acids, N-acyl naphthol sulfonic acids, arylpyrazolone sulfonic acids and N-substituted derivatives of naphthol sulfonic acids, the N-substituted group being

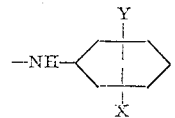

wherein X is not more than two members of the group consisting of hydrogen and methyl, and Y is one of a group consisting of hydrogen, chlorine and sulfonic acid.

2. A compound represented by the formula

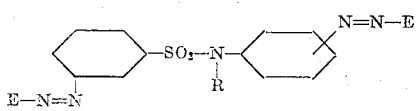

in which the group —N=N—E is in one of the positions meta and para to —NR—; R is one of a group consisting of alkyl having one to four carbons and aralkyl; and E is the residue after coupling in basic medium of an azo dye coupling component of a group consisting of naphthol sulfonic acids, amino-naphthol sulfonic acids, N-alkyl naphthol sulfonic acids, N-hydroxyalkyl naphthol sulfonic acids, N-aralkyl naphthol sulfonic acids, N-acyl naphthol sulfonic acids, arylpyrazolone sulfonic acids and N-substituted derivatives of naphthol sulfonic acids, the N-substituted group being

wherein X is not more than two members of the group consisting of hydrogen and methyl, and Y is one of a group consisting of hydrogen, chlorine and sulfonic acid.

3. A compound represented by the formula

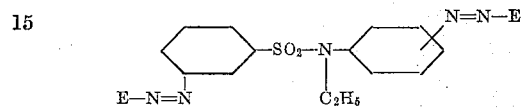

in which the group —N=N—E is in one of the positions meta and para to —NC$_2$H$_5$; and E is the residue after coupling in basic medium of an azo dye coupling component of a group consisting of naphthol sulfonic acids, amino-naphthol sulfonic acids, N-alkyl naphthol sulfonic acids, N-hydroxy-alkyl naphthol sulfonic acids, N-aralkyl naphthol sulfonic acids, N-acyl naphthol sulfonic acids, arylpyrazolone sulfonic acids and N-substituted derivatives of naphthol sulfonic acids, the N-substituted group being

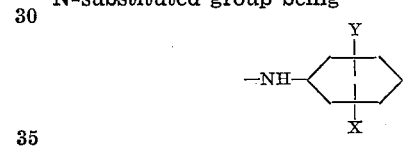

wherein X is not more than two members of the group consisting of hydrogen and methyl, and Y is one of a group consisting of hydrogen, chlorine and sulfonic acid.

4. The compound in accordance with claim 3 in which each E is the residue after coupling of 1-(2',5'-dichloro-4'-sulfophenyl)-3-methyl-5-pyrazolone.

5. The compound in accordance with claim 3 in which each E is the residue after coupling of 2-naphthol-6,8-disulfonic acid.

6. The compound in accordance with claim 3 in which each E is the residue after coupling of 2-acetylamino-8-naphthol-6-sulfonic acid.

7. Process for making water-soluble disazo dyestuffs which comprises coupling a tetrazotized diamino-benzenesulphon-N-alkylanilide of the general formula

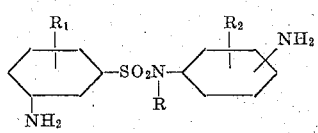

in which amino is in one of the positions meta and para to the amino nitrogen; R is one of a group consisting of alkyl having one to four carbons and aralkyl; R$_1$ and R$_2$ are from the group consisting of hydrogen, alkyl, alkoxy and halogen; with two molecular proportions of azo dye coupling components, each mole proportion being a mole proportion of at least one and not more than two mole proportions of any one of the group consisting of naphthol sulfonic acids, amino-naphthol sulfonic acids, N-alkyl naphthol sulfonic acids, N-hydroxy-alkyl naphthol sulfonic acids, N-aralkyl naphthol sulfonic acids, N-acyl naphthol sulfonic acids, arylpyrazolone sulfonic acids and N-substituted derivatives of naphthol sulfonic acids, the N-substituted group being

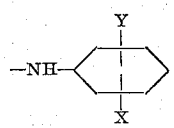

wherein X is not more than two members of the group consisting of hydrogen and methyl, and Y is one of a group consisting of hydrogen, chlorine and sulfonic acid.

WILFRID HERBERT CLIFFE.